(12) United States Patent
Gervasi et al.

(10) Patent No.: US 7,186,462 B2
(45) Date of Patent: *Mar. 6, 2007

(54) T-TYPE AMINO FUNCTIONAL RELEASE AGENT FOR FUSER MEMBERS

(75) Inventors: David J. Gervasi, West Henrietta, NY (US); Alexander N. Klymachyov, Webster, NY (US); Samuel Kaplan, Walworth, NY (US); Santokh S. Badesha, Pittsford, NY (US); Douglas B. Wilkins, Rochester, NY (US); George A. Gibson, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/877,473

(22) Filed: Jun. 25, 2004

(65) Prior Publication Data

US 2005/0287375 A1 Dec. 29, 2005

(51) Int. Cl.
*G03G 15/20* (2006.01)

(52) U.S. Cl. ............ 428/447; 399/321; 399/325; 399/333; 528/38

(58) Field of Classification Search ............... 428/447; 528/38; 399/321, 325, 333
See application file for complete search history.

(56) References Cited

U.S. PATENT DOCUMENTS

| | | | |
|---|---|---|---|
| 5,157,445 A * | 10/1992 | Shoji et al. | 399/325 |
| 5,516,361 A * | 5/1996 | Chow et al. | 106/2 |
| 6,011,946 A * | 1/2000 | Eddy et al. | 399/333 |
| 2001/0019768 A1 | 9/2001 | Kaplan et al. | |

FOREIGN PATENT DOCUMENTS

| | | |
|---|---|---|
| EP | 0 657 789 A2 | 6/1995 |
| EP | 0 662 645 A2 | 7/1995 |

\* cited by examiner

*Primary Examiner*—Margaret G. Moore
(74) *Attorney, Agent, or Firm*—Annette L. Bade

(57) ABSTRACT

A fuser member component to fuse the transferred developed image to the copy substrate, wherein the fuser member includes a substrate, an outer polymeric layer, and a release agent material coating on the outer polymeric layer, and the release agent material coating includes a T-type amino-functional siloxane release agent material having amino-functional groups, and the T-type amino-functional siloxane release agent material has the following Formula I:

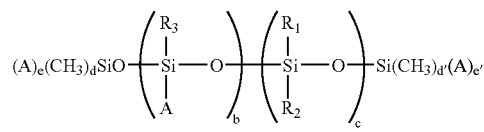

wherein A represents —$R_4$—X, wherein $R_4$ represents an alkyl group having from about 1 to about 10 carbons, X represents —$NH_2$ or —$NHR_5NH_2$ with $R_5$ representing an alkyl group having from about 1 to about 10 carbons; $R_1$ and $R_2$ are the same or different and each is selected from the group consisting of an alkyl having from about 1 to about 25 carbons, an aryl having from about 4 to about 10 carbons, and an arylalkyl; $R_3$ is a substituted diorganosiloxane chain having from about 1 to about 500 siloxane units; b and c are numbers and are the same or different and each satisfy the conditions of $1 \leq b \leq 10$ and $10 \leq c \leq 1{,}000$, d and d' are numbers and are the same or different and are 1 or 2, and e and e' are numbers and are the same or different and are 1 or 2 and satisfy the conditions that d+e=3 and d'+e'=3.

13 Claims, 1 Drawing Sheet

T-TYPE AMINO FUNCTIONAL RELEASE AGENT FOR FUSER MEMBERS

CROSS-REFERENCE TO RELATED APPLICATIONS

Attention should be given to the following co-pending patent applications, U.S. patent application, Ser. No. 10/877,472, filed Jun. 25, 2004, entitled, "Blended Amino-Functional Siloxane Release Agent for Fuser Members;" U.S. patent application, Ser. No. 10/876,505, filed Jun. 25, 2004, entitled, "Blended Amino-Functional Siloxane Release Agent for Fuser Members;" U.S. patent application, Ser. No. 10/876,404, filed Jun. 25, 2004, entitled, "Amino-Functional Siloxane Copolymer Release Agent for Fuser Members." These applications are hereby incorporated by reference in their entirety.

BACKGROUND

The present invention relates to fuser members useful in electrostatographic reproducing apparatuses, including digital, image on image, and contact electrostatic printing and copying apparatuses. The present fuser members may be used as fuser members, pressure members, transfuse or transfix members, and the like. In an embodiment, the fuser members comprise an outer layer comprising a polymer and having thereon, a liquid release agent. In embodiments, the release agent is an amino functional siloxane release agent. In embodiments, the amino-functional siloxane release agent comprises a pendant functional amino group. In embodiments, more than one amino-functional release agent is used as a blend. In still other embodiments, the amino functional siloxane release agent is a T-type amino functional siloxane release agent.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable to increase the temperature of the substrate substantially higher than about 250° C., because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,029,827 discloses the use of polyorganosiloxanes having mercapto functionality as release agents.

U.S. Pat. No. 4,101,686 to Strella et al. and U.S. Pat. No. 4,185,140 also to Strella et al., both disclose polymeric release agents having functional groups such as carboxy, hydroxy, epoxy, amino, isocyanate, thioether, or mercapto groups.

U.S. Pat. No. 5,157,445 to Shoji et al. discloses toner release oil having a functional organopolysiloxane of a certain formula.

U.S. Pat. No. 5,395,725 to Bluett et al. discloses a release agent blend composition wherein volatile emissions arising from the fuser release agent oil blend are reduced or eliminated.

U.S. Pat. No. 5,512,409 to Henry et al. teaches a method of fusing thermoplastic resin toner images to a substrate using amino functional silicone oil over a hydrofluoroelastomer fuser member.

U.S. Pat. No. 5,516,361 to Chow et al. teaches a fusing member having a thermally stable FKM hydrofluoroelastomer surface and having a polyorgano T-type amino functional oil release agent. The oil has predominantly monoamino functionality per active molecule to interact with the hydrofluoroelastomer surface.

U.S. Pat. No. 5,531,813 to Henry et al. discloses a polyorgano amino functional oil release agent having at least 85% monoamino functionality per active molecule to interact with the thermally stable FKM hydrofluoroelastomer surface of the fuser member.

U.S. Pat. No. 5,698,320 discloses the use of fluorosilicone polymers for use on fixing rollers with outermost layers of perfluoroalkoxy and tetrafluoroethylene resins.

U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer.

U.S. Pat. No. 5,747,212 to Kaplan et al. discloses an amino functional oil having a formulation set forth in the patent.

U.S. Pat. No. 6,183,929 B1 to Chow et al. discloses a release agent comprising (a) an organosiloxane polymer containing amino-substituted or mercapto-substituted organosiloxane polymers, wherein the amino or mercapto functional groups on at least some of the polymer molecules having a degree of functionality of from about 0.2 to about 5 mole percent, and (b) a nonfunctional organosiloxane polymer having a viscosity of from about 100 to about 2,000 centistrokes, and wherein the mixture has a degree of functionality of from about 0.05 to about 0.4 mole percent.

The use of polymeric release agents having functional groups, which interact with a fuser member to form a thermally stable, renewable self-cleaning layer having good release properties for electroscopic thermoplastic resin toners, is described in U.S. Pat. No. 4,029,827.

In high-speed color fusing applications, adequate coverage of the fuser member surface is required to meet the demanding environmental conditions and exposure to various levels of toner materials and additives, rapid high temperature thermal cycling and various media composition and weights. Amino silicone release agents are typically used in such high-speed color fusing systems, due to their ability to sufficiently react with the fluoroelastomer surface coatings that are used in conventional fuser member component compositions. In maintaining a printing system level balance and reliability among the fuser member coating properties, paper properties, toner composition and image content it is necessary to utilize a release fluid that is robust against average customer document job mix failures modes as well as specific stress cases that result in failure modes that render the fuser member unusable and thus increase costs of operations and ownership.

Several specific examples of these catastrophic failure modes are outlined herein. A stripping failure in an electrophotographic fusing system is defined as a failure where the paper leaving the exit nip of the fuser is still adhered to the roll surface, resulting in the paper following the fuser surface back around rather than freely leaving the nip. This failure is caused by a failure of the release agent to split within the layer applied to the fuser member surface or by toner on the imaged page contacting the fuser member surface; resulting in adhesive forces holding the imaged page to the member as the sheet passes through the nip. This results in the paper being heated too long, the toner in contact with the fuser member surface for an extended period of time and potential non-recoverable jam situations that render the fuser member unusable beyond this particular failure mode. Offset failures in high-speed color fusing are characterized by a gradual build-up of un-transferred or unreleased residual toner and built-up gelation of oil over the course of several thousand copies. It is observed under different image densities and conditions than stripping failures, and also results in a catastrophic failure for the fuser member. As copy count increases and material from gelled fuser oil and toner continue to accumulate on the fuser surface, the material eventually builds up to such a level that it transfers back to subsequent images, resulting in a noticeable print quality defect. The location of the built up material on the roll will continue to transfer a defect to prints and is difficult to remove, thus rendering the fuser member unusable after the point of failure. Accelerated testing can be performed for each of these failure modes. In some cases, the offset stripping defect will occur in the stripping stress test. In most cases, however, each accelerated stress test will only exhibit a catastrophic failure in the failure mode it is testing for. Thus it is possible that silicone release agents possessing different structures, methods of making, and compositions, could be useful for mitigating each of the respective defects in high-speed color fusing applications.

In addition, some print quality defects are observable in high-speed color applications that render the print objectionable to the customer. One example of a print quality defect, although there are several, is denoted as wavy gloss. Wavy gloss is a print quality defect that exhibits random variable gloss levels within a single imaged sheet. The defect can appear and disappear, but occurs to varying levels depending on the nature and composition of the release fluid.

There are three major failure modes of the high-speed full process color fusing namely stripping, hot offset and wavy gloss. The first two impact the fuser reliability, which is basically fuser life and paper jamming. The third failure mode results into image quality defects due to differential gloss. Differential gloss is a phenomenon that occurs when there is a noticeable difference in the gloss levels between different spots within a single image/page. Normally, this is associated with characteristic wear patterns or other artifacts on the fuser roll or other hardware. Differential gloss typically appears in a stark delineation in appearance. The wavy gloss is wavy, or in other words, the width and length of the pattern on the image is variable and not delineated, as in most typical differential gloss print artifacts.

Therefore, for polymeric outer layers, including fluoroelastomeric fuser member outer layers, there exists a specific need for a release agent, which provides sufficient wetting of the fuser member. It is further desired to provide a fuser member release agent, which has little or no interaction with copy substrates such as paper, so that the release agent does not interfere with adhesives and POST-IT® notes (by 3M) adhering to the copy substrate such as paper. It is further desired that the oil not prevent ink adhesion to the final copy substrate. In addition, it is desired that the release agent does not react with components of the toner. It is also desired to provide an amino-functional release agent decreases or eliminates gelation. Also, it is desired to provide a release agent that enables increase in life of the fuser member by improved spreading of the release agent. A further desired feature is to provide a fuser release agent increases life of the fuser member by decreasing offset failure and stripping failures, reducing paper jams, and improving overall image quality.

SUMMARY

Embodiments herein include a fuser member comprising a substrate; an outer polymeric layer; and a release agent material coating on the outer polymeric layer, wherein the release agent material coating comprises a T-type amino-functional siloxane release agent material having amino-functional groups, wherein the T-type amino-functional siloxane release agent material has the following Formula I:

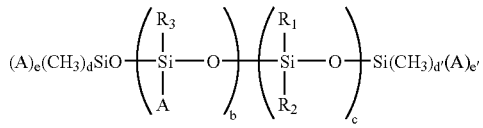

wherein A represents —R$_4$—X, wherein R$_4$ represents an alkyl group having from about 1 to about 10 carbons, X represents —NH$_2$ or —NHR$_5$NH$_2$ with R$_5$ representing an alkyl group having from about 1 to about 10 carbons; R$_1$ and R$_2$ are the same or different and each is selected from the group consisting of an alkyl having from about 1 to about 25 carbons, an aryl having from about 4 to about 10 carbons, and an arylalkyl; R$_3$ is a substituted diorganosiloxane chain having from about 1 to about 500 siloxane units; b and c are numbers and the same or different and each satisfy the conditions of $1 \leq b \leq 10$ and $10 \leq c \leq 1,000$, d and d' are numbers and are the same or different and are 1 or 2, and e and e' are numbers and are the same or different and are 1 or 2 and satisfy the conditions that d+e=3 and d'+e'=3.

Also, embodiments include a fuser member comprising a substrate; an outer polymeric layer comprising a fluoroelastomer; and a release agent material coating on the outer polymeric fluoroelastomer layer, wherein the release agent material coating comprises a T-type amino functional siloxane release agent material having amino-functional groups, wherein the T-type amino functional siloxane release agent material has the following Formula I:

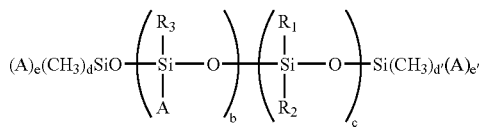

wherein A represents —R$_4$—X, wherein R$_4$ represents an alkyl group having from about 1 to about 10 carbons, X represents —NH$_2$ or —NHR$_5$NH$_2$ with R$_5$ representing an alkyl group having from about 1 to about 10 carbons; R$_1$ and R$_2$ are the same or different and each is selected from the group consisting of an alkyl having from about 1 to about 25 carbons, an aryl having from about 4 to about 10 carbons, and an arylalkyl; R$_3$ is a substituted diorganosiloxane chain having from about 1 to about 500 siloxane units; b and c are numbers and are the same or different and each satisfy the conditions of $1 \leq b \leq 10$ and $10 \leq c \leq 1,000$, d and d' are numbers and are the same or different and are 1 or 2, and e and e' are numbers and are the same or different and are 1 or 2 and satisfy the conditions that d+e=3 and d'+e'=3.

Embodiments further include an image forming apparatus for forming images on a recording medium comprising a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a substrate; an outer polymeric layer; and a release agent material coating on the outer polymeric layer, wherein the release agent material coating comprises a T-type amino-functional siloxane release agent material having amino-functional groups, wherein the T-type amino-functional siloxane release agent material has the following Formula I:

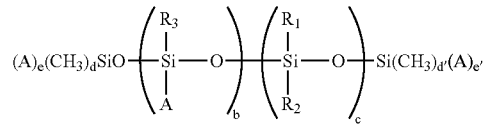

wherein A represents —R$_4$—X, wherein R$_4$ represents an alkyl group having from about 1 to about 10 carbons, X represents —NH$_2$ or —NHR$_5$NH$_2$ with R$_5$ representing an alkyl group having from about 1 to about 10 carbons; R$_1$ and R$_2$ are the same or different and each is selected from the group consisting of an alkyl having from about 1 to about 25 carbons, an aryl having from about 4 to about 10 carbons, and an arylalkyl; R$_3$ is a substituted diorganosiloxane chain having from about 1 to about 500 siloxane units; b and c are numbers and are the same or different and each satisfy the conditions of $1 \leq b \leq 10$ and $10 \leq c \leq 1,000$, d and d' are numbers and are the same or different and are 1 or 2, and e and e' are numbers and are the same or different and are 1 or 2 and satisfy the conditions that d+e=3 and d'+e'=3.

BRIEF DESCRIPTION OF THE DRAWINGS

For a better understanding of the present invention, reference may be had to the accompanying figures.

DETAILED DESCRIPTION

The present invention relates to fuser members having a liquid release agent or fuser oil in combination therewith. The fuser member has an outer layer in combination with an amino-functional release agent. The present amino-functional release agent results in a decrease or elimination of gelation, even when used in color fusing. The present amino-functional release agent forms a chemical bond with the outer fusing surface, which provides a renewable release layer that allows the fused image to freely detach from the surface of the fuser member upon exit from the high pressure, high temperature fuser nip. The amino-functional release agent is especially useful in high performance, fast and full process color printer and copy machines. The amino-functional release agent increases the life of the fuser member, thereby resulting in a cost savings and increased satisfaction to the customer.

The faster and full process color fusing requires higher toner pile heights and relatively higher fusing temperatures. As a result, the thermal stability requirements for the fuser materials and the release oils are more stringent as compared to black and white, and slower speed fusing. Higher temperature has an adverse effect on maintaining the desired amine level for chemical reaction with the fuser surface, and in gelation attributes on the fuser roll surface. In addition, the components of the four color toners which may vary in amounts and type can also have an adverse effect on the ability of the amino oil to interact with the fuser surface. This results into faster dirtying of the oil sump, slimes on the fuser surface, and streaks causing premature fuser failures, paper jams and image quality defects. The described fuser oil eliminates or reduces the above-listed problems, in embodiments.

Figure 1:
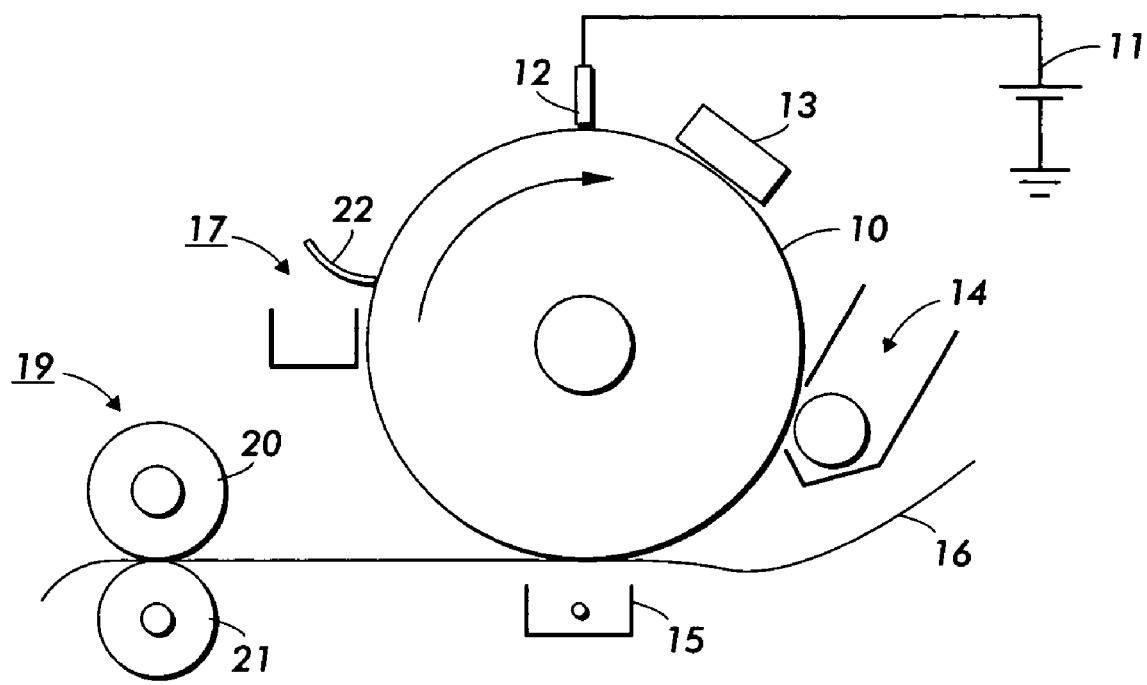
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
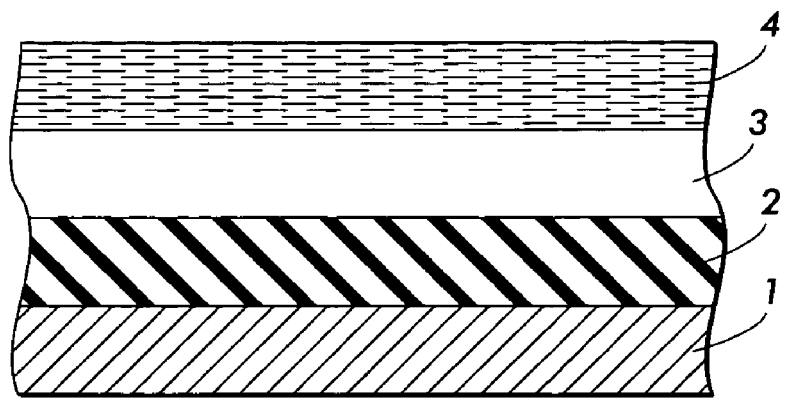
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 1 has an optional intermediate layer 2 thereon. Intermediate layer 2 can be, for example, a rubber such as silicone rubber or other suitable material. On optional intermediate layer 2 is positioned outer layer 3, which comprises a polymer such as those described below. Positioned on outer layer 3 is outermost liquid amino-functional siloxane release layer 4.

Examples of the outer surface polymers of the fuser system members include fluoropolymers such as fluoroelastomers and hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of two vinylidenefluoride and hexafluoropropylene (known commercially as VITON® A); 2) terpolymers of vinylidenefluoride, hexafluoropropylene and tetrafluoroethylene (known commercially as VITON® B); and 3) tetrapolymers of vinylidenefluoride, hexafluoropropylene, tetrafluoroethylene and cure site monomer (known commercially as VITON® GH and VITON® GF). Examples of commercially available fluoroelastomers include those sold under various designations such as VITON® A, VITON® B, VITON® E, VITON® E60C, VITON® E430, VITON® 910, VITON® GH; VITON® GF; and VITON® ETP. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer. These listed are commercially available from DuPont. The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene with about 2 weight percent cure site monomer.

Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII1900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of other fluoropolymers include fluoroplastics or fluoropolymers such as polytetrafluoroethylene, fluorinated ethylene propylene resin, perfluoroalkoxy, and other TEFLON®-like materials, and polymers thereof.

In embodiments, a fluoroelastomer can also be blended or copolymerized with non-fluorinated ethylene or non-fluorinated propylene.

Examples of suitable silicone rubbers include high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

The amount of polymer compound in solution in the outer layer solution, in weight percent total solids, is from about 10 to about 25 percent, or from about 16 to about 22 percent by weight of total solids. Total solids as used herein include the amount of polymer, dehydrofluorinating agent (if present) and optional adjuvants and fillers.

An inorganic particulate filler may be used in connection with the polymeric outer layer, in order to provide anchoring sites for the functional groups of the fuser agent. Examples of suitable fillers include inorganic fillers such as silicas or a metal-containing filler, such as a metal, metal alloy, metal oxide, metal salt, or other metal compound. The general classes of metals which can be used include those metals of Groups 1a, 2a, 2b, 3a, 3b, 4a, 4b, 5a, 5b, 6b, 7b, 8 and the rare earth elements of the Periodic Table. For example, the filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers of aluminum oxide and cupric oxide. Other examples include reinforcing and non-reinforcing calcined alumina and tabular alumina respectively, along with silicas.

The thickness of the outer polymeric surface layer of the fuser member herein is from about 10 to about 250 micrometers, or from about 15 to about 100 micrometers.

Optional intermediate adhesive layers and/or intermediate polymer or elastomer layers may be applied to achieve desired properties and performance objectives of the present invention. The intermediate layer may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer may be bonded to the substrate via an adhesive layer.

The thickness of the intermediate layer is from about 0.5 to about 20 mm, or from about 1 to about 5 mm.

The release agents or fusing oils described herein are provided onto the outer layer of the fuser member via a delivery mechanism such as a delivery roll. The delivery roll is partially immersed in a sump, which houses the fuser oil or release agent. The amino-functional oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

Examples of suitable amino-functional release agent materials include those having pendant and/or terminal amino groups, such as those having the following Formula I:

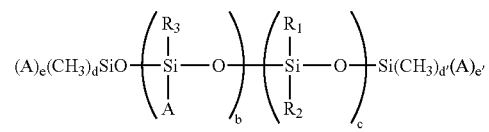

wherein A represents —$R_4$—X, wherein $R_4$ represents an alkyl group having from about 1 to about 10 carbons, or from about 1 to about 8 carbons, such as methyl, ethyl, propyl, and the like, X represents —$NH_2$ or —$NHR_5NH_2$ with $R_5$ being the same as $R_4$ above; $R_1$ and $R_2$ are the same or different and each is an alkyl having from about 1 to about 25 carbons, such as methyl, ethyl, propyl, butyl, and the like, aryl having from about 4 to about 10 carbons, or from about 6 to about 8 carbons, such as cyclobutyl, cyclopentyl, phenyl, and the like, and arylalkyl such as methylphenyl, ethylphenyl, propylphenyl, and the like; $R_3$ can be a substituted diorganosiloxane chain having from about 1 to about 500 siloxane units, or from about 50 to about 200 siloxane units, and substituted with alkyl, aryl or arylalkyl as defined for $R_1$ and $R_2$ above; b and c are numbers and are the same or different and each satisfy the conditions of $0 \leq b \leq 10$ or $1 \leq b \leq 10$ and $10 \leq c \leq 1,000$, but both b and c must not be 0 at the same time; and d and d' are numbers and are the same or different and are 2 or 3, and e and e' are numbers and are the same or different and are 0 or 1 and satisfy the conditions that d+e=3 and d'+e'=3. In embodiments, b is at least 1, and d, d', e and e' are 1 or 2, as long as they satisfy the above conditions.

In embodiments, d and d' are 1, and e and e' are 2.

In embodiments, d and d' are 2, and e and e' are 1.

In embodiments, d is 1, d' is 2, e is 2 and e' is 1.

In embodiments, X represents —$NH_2$, and $R_4$ is propyl.

In embodiments, X represents —$NHR_5NH_2$, and in embodiments, $R_5$ is propyl.

In embodiments, the T-type amino-functional siloxane release agent material has an amino functionality provided by aminopropyl methyl siloxy groups. In other embodiments, the T-type amino-functional siloxane release agent material has an amino functionality provided by N-(2-aminoethyl)-3-aminopropyl siloxy groups. In still other embodiments, the T-type amino functional siloxane release agent material comprises trialkylsiloxy end groups.

In specific embodiments, the amino-functional fluid has the following formulas below. In the formulas below, the diorgano-substitutions on silicon are not shown.

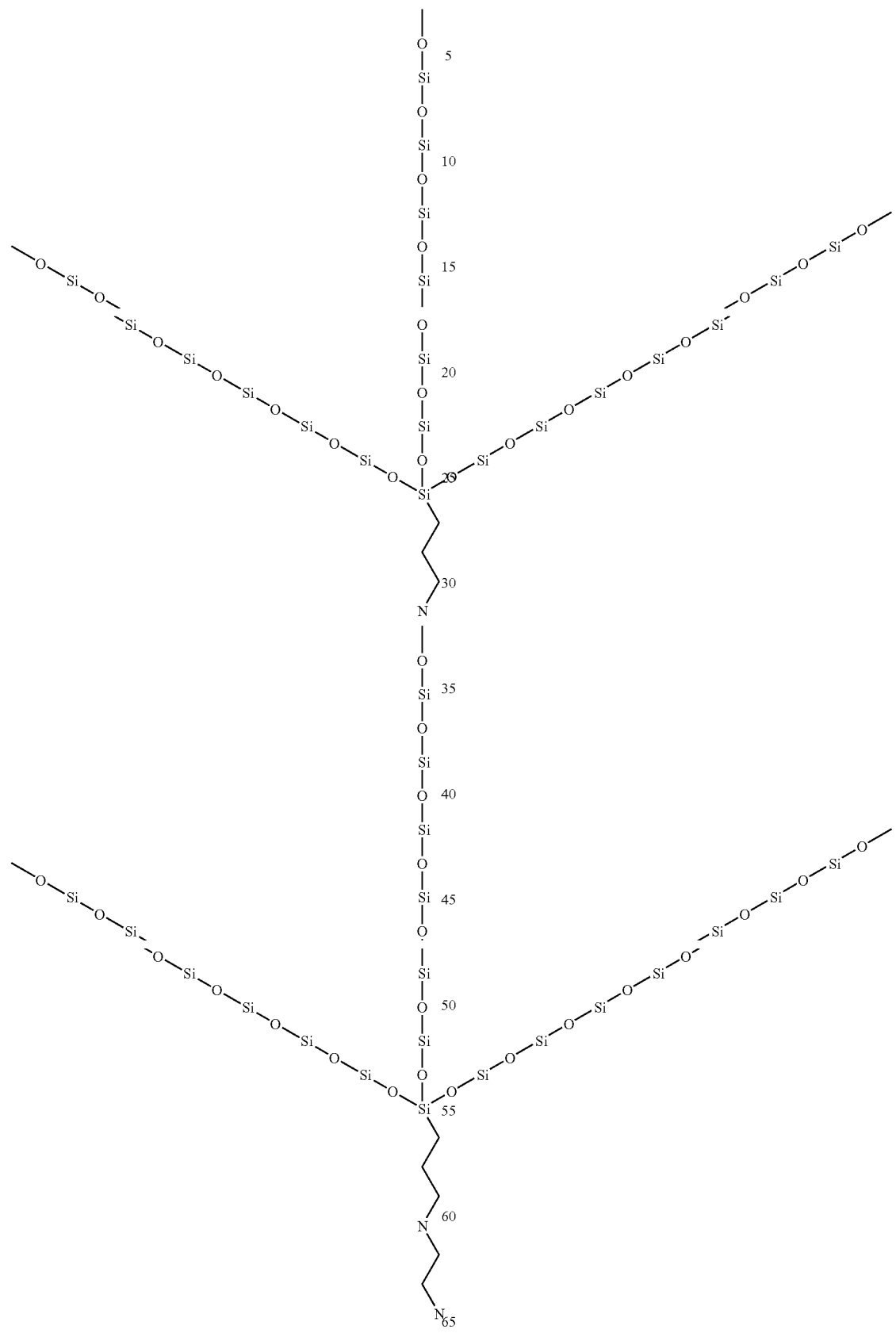

In embodiments, the amine concentration is from about 0.01 to about 0.9 mole percent, or from about 0.03 to about 0.6 mole percent, or from about 0.06 to about 0.30 mole percent. Mole percent amine refers to the relationship:

100×(moles of amine groups/moles of silicon atoms).

Alternatively, a blend of two amino-functional release agent materials can be used as the release agent composition. For example, a blend of two or more of the above-described amino-functional release agents can be used. In embodiments, the blend comprises two different release agent materials of the above Formula I. In other embodiments, a blend of two or more different amino-functional release agents having the above amine concentrations can be used.

A nonfunctional oil, as used herein, refers to oils that do not have chemical functionality which interacts or chemically reacts with the surface of the fuser member or with fillers on the surface. A functional oil, as used herein, refers to a release agent having functional groups which chemically react with the fillers present on the surface of the fuser member, so as to reduce the surface energy of the fillers so as to provide better release of toner particles from the surface of the fuser member. If the surface energy is not reduced, the toner particles will tend to adhere to the fuser roll surface or to filler particles on the surface of the fuser roll, which will result in copy quality defects.

A generic method for making amino functionalized polydimethylsiloxane fuser oils includes making an amine-containing polydimethylsiloxane concentrate and subsequently diluting with nonfunctional polyorganosiloxane oil to provide a mixture with a distribution of amines in a large group of siloxanes. In making the concentrate, a broader distribution of the amine functionality mono-, di- and tri-amino may be obtained. In a typical reaction, end blocker, amino siloxane, catalyst and octamethyltetracyclosiloxane are reacted in a vessel at elevated temperature (of from about 100 to about 210° C., or from about 145 to about 185° C.), for a desired time (of from about 2 to about 15 hours, or from about 5 to about 10 hours). During this time period, the ring opening and bond reformation occurs, resulting into random distribution of amine functionality on the polydimethylsiloxae chains. The residual catalyst is deactivated. This is generally followed by final removal of the volatiles under heat (for example, a temperature of from about 175 to about 250° C., or from about 195 to about 220° C.), and pressure (for example, of from about 0.5 to about 5 torr, or from about 1 to about 2 torr). The resulting reaction product is then diluted with non-functional polydimethylsiloxane for use as fuser oil. The amount and viscosity of the non-functional polydimethylsiloxane depends upon what is required for final oil.

Alternatively, in formulating the functional oils that contain predominantly one amine-functional group per chain, a desired level of amine concentration and final molecular weight are decided upon and the appropriate amounts of amine-containing monomer, non-amine containing monomer, trimethylsiloxy end blocker, and polymerization catalysts are added to the reaction vessel. This procedure maximizes the number of active molecules containing only one amine-functional group. In contrast to this procedure, when a concentrate is first prepared, there is greater opportunity for a larger fraction to become multi-functional. This is because in a concentrate, there is a higher fraction of amine groups present, thereby creating the opportunity for greater amino functionality per active chain. In contrast, in the batch, one pot, or one shot process, the amount of ingredients added is varied to provide or maximize the number of active molecules containing only one amine-functional group. It is possible to make the functional oil containing a maximum number of active molecules with one amine-functional group in a continuous run process with appropriate control over the timing of addition and the amount of ingredients added.

The term active molecule as used herein, refers to the silicone oil molecule having the amino functional group as part of its chemical structure. Typical polyorganosiloxanes containing a maximum number of active molecules with one amine-functional group may include, for example, methyl aminopropyl dimethyl siloxane, ethyl aminopropyl dimethyl siloxane, benzyl aminopropyl dimethyl siloxane, dodecyl aminopropyl dimethyl siloxane, aminopropyl methyl siloxane, and the like. These polyorganosiloxanes typically have a viscosity of from about 100 to about 1,000 centipoise at 20° C. This permits easy handling of the oil particularly when delivering it to the fuser member.

In an embodiment, the amino functionality is provided by aminopropyl methyl siloxy groups. In another embodiment, the amino functionality is provided by N-(2-aminoethyl)-3-aminopropyl siloxy groups.

As may be observed from the formulas above, the functional amino group can be at some random point in the backbone of the chain of the polyorganosiloxane, which is flanked by trialkylsiloxy end groups. Also, as may be observed from the formulas, the amino group may be a primary, secondary amine, or tertiary amine.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of 350 cs Aminopropyl Functional Silicone Oil

An amount of 1.35 kilograms of octamethyl cyclotetrasiloxane, 14.4 grams of aminopropyl methyl siloxane, 18 grams of trimethyl silanol, and sufficient potassium silanolate to yield a mixture of 0.01 weight percent potassium silanolate, were placed into a reaction vessel equipped with a reflux column, and heated at 150° C. for 7 hours. The solution was cooled and neutralized with ammonium bicarbonate to produce a 0.67 mol percent amino silicone oil having a number average molecular weight of 13.65 Kg/mole and a viscosity of 350 cs. All of the amino oil concentrate (1.382 kg) was then added to 8.907 kg of a 350 cs non-functional polydimethylsilicone oil to yield the desired 0.09 mol percent amine level.

Example 2

Preparation of 350 cs Aminoethyl-Aminopropyl Functional Silicone Oil

An amount of 1.35 kilograms of octamethyl cyclotetrasiloxane, 19.7 grams of N-(2-aminoethyl)-3-aminopropyl methyl siloxane, 18 grams of trimethyl silanol, and sufficient potassium silanolate to yield a mixture of 0.01 weight percent potassium silanolate, were placed into a reaction vessel equipped with a reflux column, and heated at 150° C. for 7 hours. The solution was cooled and neutralized with ammonium bicarbonate to produce a 0.67 mol percent diamino silicone oil having a number average molecular weight of 13.65 Kg/mole and a viscosity of 350 cs. All of the amino oil concentrate (1.382 kg) was then added to 8.907 kg of a 350 cs non-functional polydimethylsilicone oil to yield the desired 0.09 mol percent pendant functional amine groups.

Example 3

Comparative Testing of Amino Functional Silicone Oil

Several standard amino functional silicone release agents were used in proprietary stress tests for the aforementioned failure modes in a high-speed color fusing application. These samples are denoted by F1, F2 and F3. These are known release agents used in commercial machine architecture, and are representative of the performance of a currently produced fluid. The stripping test was performed to 60K prints suspension. The offset testing was performed to 73K prints suspension. The started wavy gloss was tested to 60K prints suspension. The results are shown in Table 1 below.

TABLE 1

| Sample | Stripping Test (K prints) | Offset Test (K prints) | Started wavy gloss (K prints) | Failed for wavy gloss (K prints) |
|---|---|---|---|---|
| F1 | 24 | 68.8 | 1.1 | 1.1 |
| F2 | 38.9 | 40.5 | 1.1 | 1.1 |
| F3 | 46.2 | 23.4 | 1.1 | 2.1 |

Table 2 below shows the results of candidate fluids. Candidate improved fluids, denoted by 1 and 5 are structurally T-N-(2-aminoethyl)-3-aminopropyl polydimethylsiloxane and D-aminopropyl methyl polydimethylsiloxane, respectively. Fluid 1, prepared in a manner similar to Example II, has worked well in historical testing with respect to offset failures, while Fluid 5, prepared in a manner similar to Example I, has shown some improvement in stripping stress testing relative to the current fluids, F1–F3. Several blends of the two fluid structures were tested for both failure modes simultaneously. As shown in the above data, Fluids 3a and 3b, both a 1:1 ratio blend of the two fluid structures at the same viscosity and concentration of amine functionality, exhibited improved performance over the current production fluids, F1–F3.

TABLE 2

| Sample | Stripping test (K prints) | Offset Test (K Prints) |
|---|---|---|
| 1 | 3.2 | |
| 2 | 60.2 | |
| 3a | 60.3 | 52.9 |
| 3b | 60.2 | 48.8 |
| 4 | 23.7 60 K susp. | |
| 5 | 51.3 Mis-Strip due to Offset | |

Example 4

T-Type Amino Functional Silicone Oil

Example 1 conditions can be repeated, but modified in order to produce a T-type functional oil as described herein. It is believed that good stripping results would be obtained with the T-type material.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A fuser member comprising:
   a substrate;
   an outer polymeric layer; and
   a release agent material coating on the outer polymeric layer, wherein the release agent material coating comprises a T-type amino-functional siloxane release agent material having amino-functional groups, wherein said T-type amino-functional siloxane release agent material has a formula selected from the group consisting of the following Formula I and Formula II:

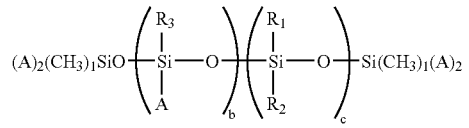

Formula I and

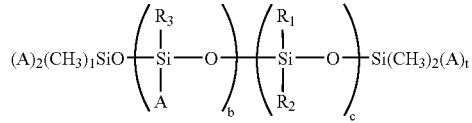

Formula II wherein in both Formulas I and II above, A represents —$R_4$—X, wherein $R_4$ represents an alkyl group having from about 1 to about 10 carbons, X represents —$NH_2$ or —$NHR_5NH_2$ with $R_5$ representing an alkyl group having from about 1 to about 10 carbons; $R_1$ and $R_2$ are the same or different and each is selected from the group consisting of an alkyl having from about 1 to about 25 carbons, an aryl having from about 4 to about 10 carbons, and an arylalkyl; $R_3$ is a substituted diorganosilaxane chain having from about 1 to about 500 siloxane units; and b and c are numbers and the same or different and each satisfy the conditions of $1 \leq b \leq 10$ and $10 \leq c \leq 1{,}000$.

2. A fuser member in accordance with claim 1, wherein in the Formula I, X represents —$NH_2$, and $R_4$ is propyl.

3. A fuser member in accordance with claim 1, wherein in the Formula I, X represents —$NHR_5NH_2$, and $R_5$ is propyl.

4. A fuser member in accordance with claim 1, wherein the T-type amino-functional siloxane release agent material has an amino functionality provided by N-(2-aminoethyl)-3-aminopropyl siloxy groups.

5. A fuser member in accordance with claim 1, wherein said T-type amino functional siloxane release agent material has a viscosity of from about 100 to about 1,000 centipoise at 20° C.

6. A fuser member in accordance with claim 1, wherein said outer polymeric layer comprises a polymer selected from the group consisting of fluoroelastomers and hydrofluoroelastomers.

7. A fuser member in accordance with claim 6, wherein said outer polymeric layer comprises a fluoroelastomer.

8. A fuser member in accordance with claim 7, wherein said fluoropolymer is a fluoroelastomer selected from the group consisting of a) copolymers of two of vinylidene fluoride, hexafluoropropylene, and tetrafluoroethylene, b) terpolyrners of vinylidene fluoride, hexafluoropropylene, and tetrafluoroethylene, and c) tetrapolymers of vinylidene fluoride, hexafluoropropylene, tetrafluoroethylene, and a cure site monomer.

9. A fuser member in accordance with claim 8, wherein the fluoroelastomer comprises about 35 weight percent of vinylidenefluoride, about 34 weight percent of hexafluoropropylene about 29 weight percent of tetrafluoroethylene, and about 2 weight percent cure site monomer.

10. A fuser member in accordance with claim 1, further comprising an intermediate layer positioned between the substrate and the outer polymeric layer.

11. A fuser member in accordance with claim 10, wherein the intermediate layer comprises silicone rubber.

12. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member in accordance with claim 1.

13. A image forming apparatus in accordance with claim 12, wherein the said toner is color toner.

* * * * *